March 14, 1950   J. M. NICKELSEN ET AL   2,500,496
VEHICLE SEAT ASSEMBLY
Filed Dec. 11, 1944   3 Sheets-Sheet 2
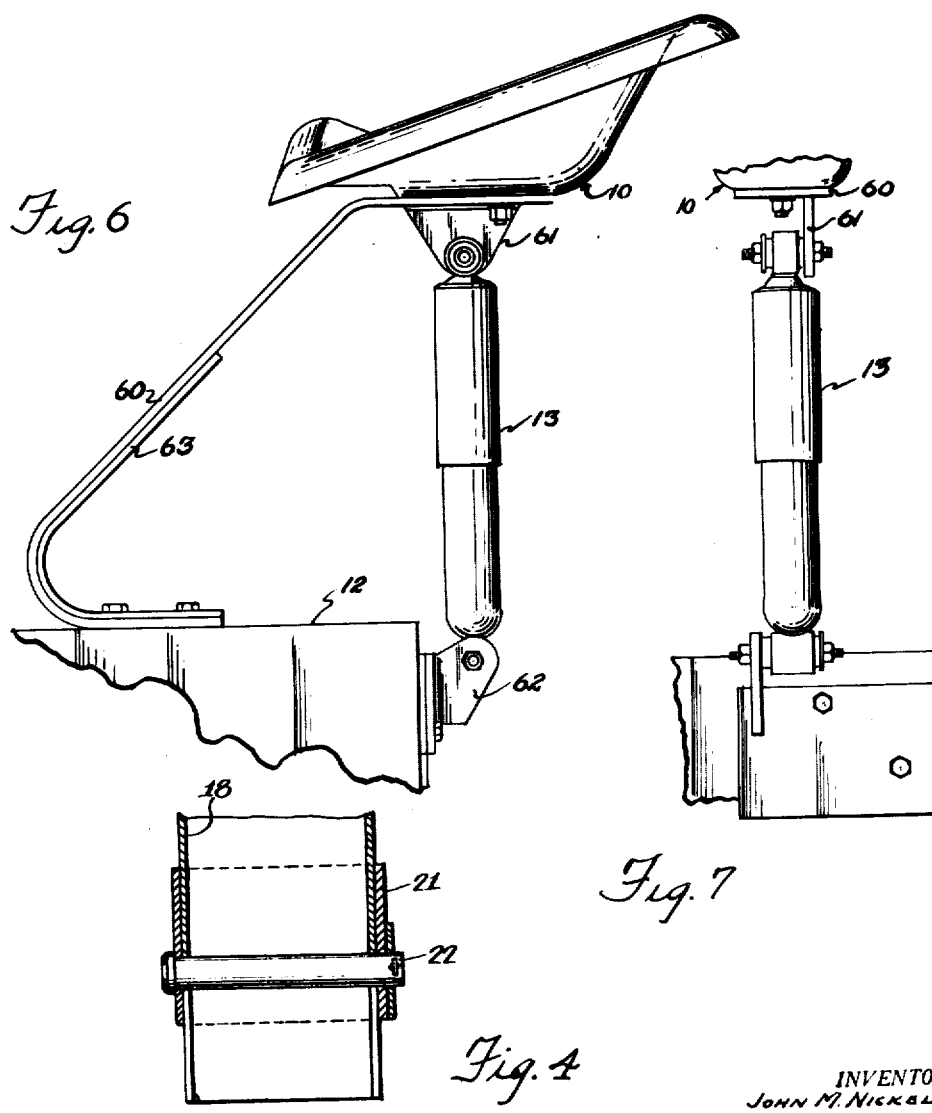
INVENTORS
JOHN M. NICKELSEN
CHARLES E. READ
ROY G. SPIESS
ARTHUR BOOR
BY
Whittemore Hulbert & Belknap
ATTORNEYS

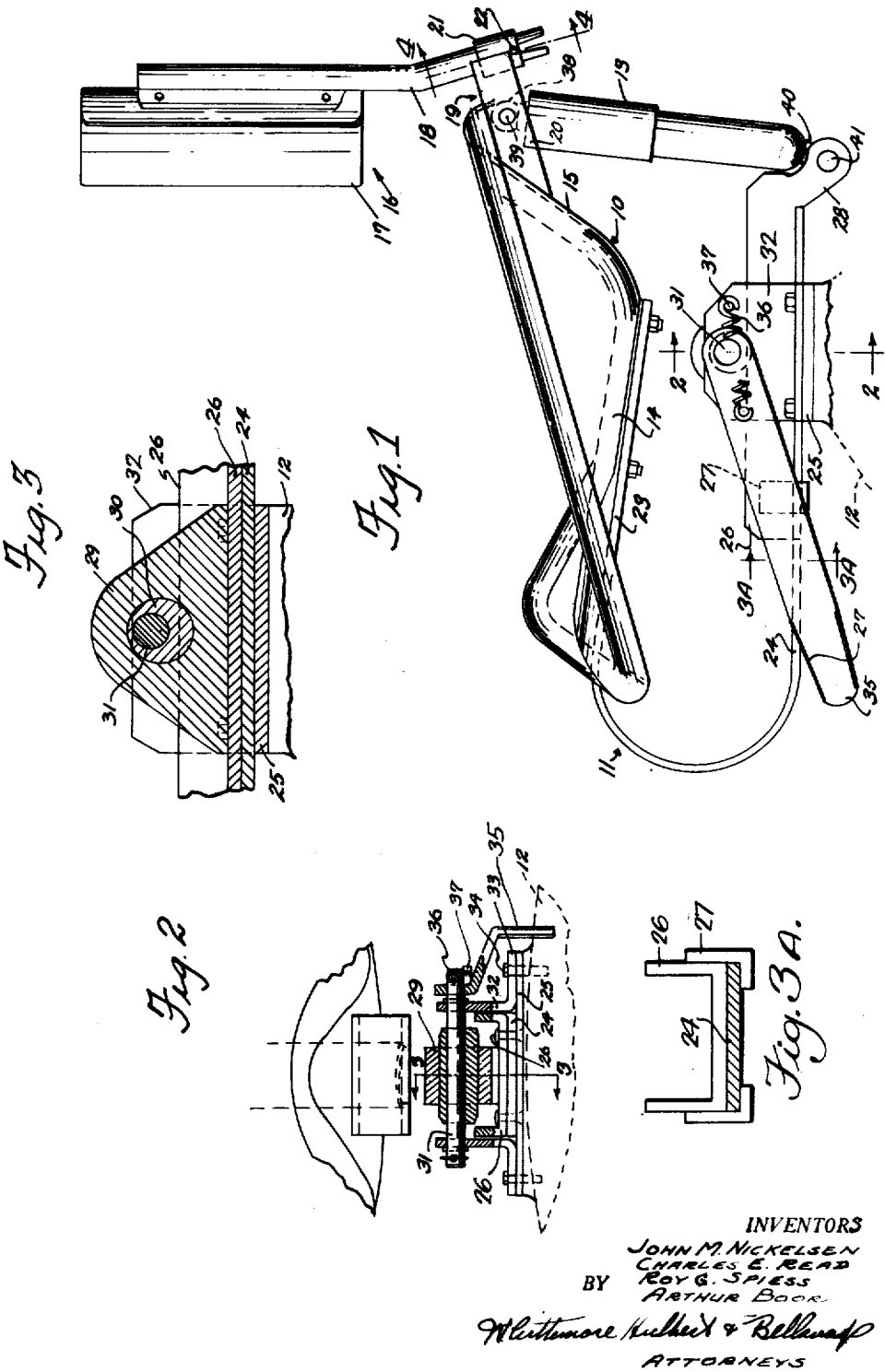

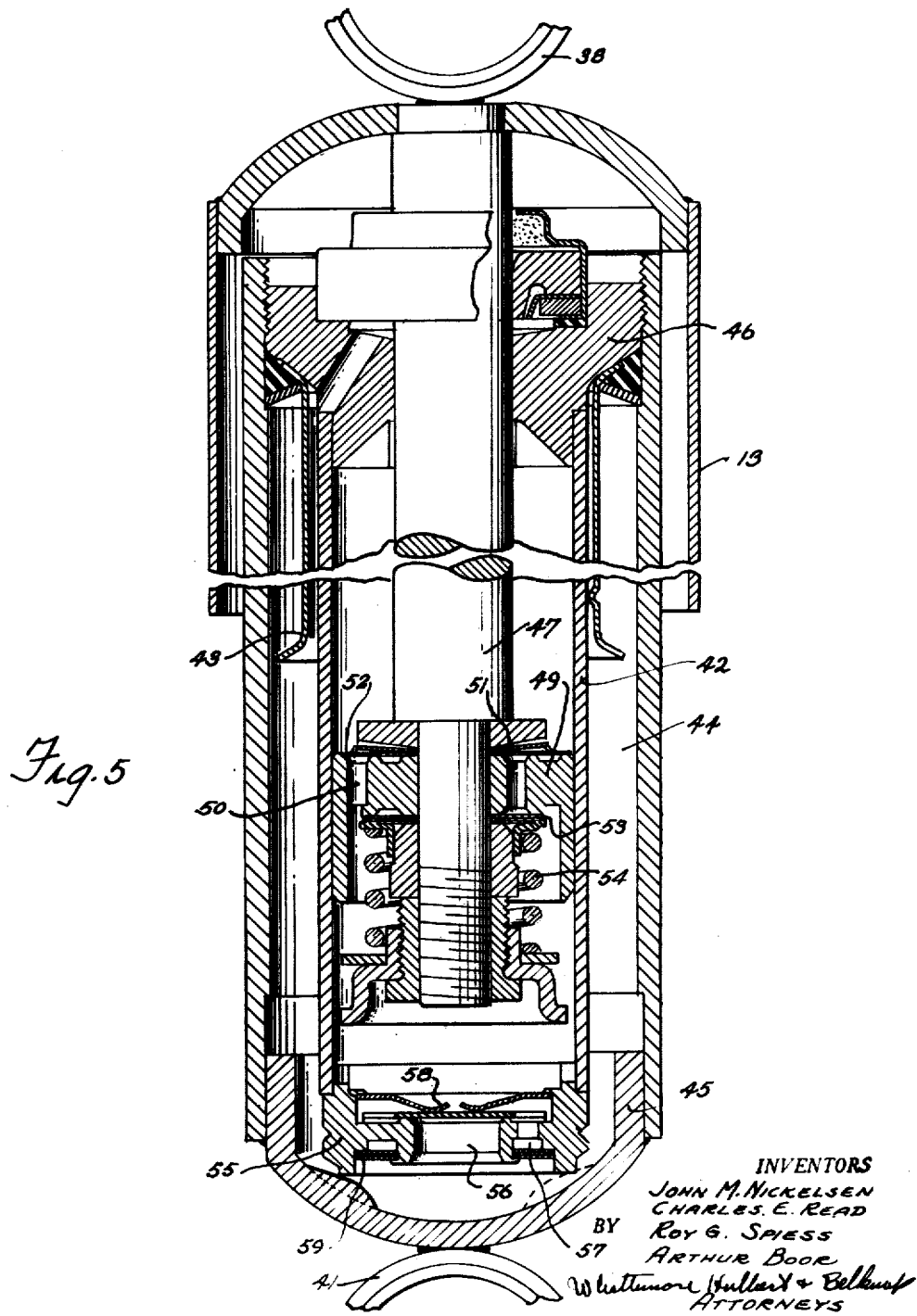

Patented Mar. 14, 1950

2,500,496

UNITED STATES PATENT OFFICE 2,500,496

VEHICLE SEAT ASSEMBLY

John M. Nickelsen, Ann Arbor, and Charles E. Read and Roy G. Spiess, Monroe, Mich., and Arthur Boor, Toledo, Ohio, assignors to Monroe Auto Equipment Company, Monroe, Mich., a corporation of Michigan Application December 11, 1944, Serial No. 567,644

1 Claim. (Cl. 155—9)

This invention relates to vehicle seats and refers more particularly to an improved mounting for vehicle seats.

In many types of vehicles, such for example as tractors, the chassis frame is either directly connected to the road engaging wheels or is connected to the latter through suspension systems embodying springs which, of necessity, must be very stiff to enable operation of the vehicle over uneven or rough ground. In either case the operator of the vehicle is subjected to an extremely rough ride, and this is true even though the seat for the operator is spring mounted, as the shocks resulting from propelling the vehicle over rough ground imparts an oscillating motion to the seat, which is not only annoying but is very tiring.

The present invention contemplates an improved vehicle seat mounting wherein the seat is supported on the vehicle through spring means and wherein the action of the spring means is controlled by a direct acting shock absorber of the type capable of damping or diminishing the motion of the seat caused by energy stored in the spring means when the wheels of the vehicle pass over irregularities in the road surface.

Another object of this invention is to provide a seat construction with a direct acting tubular type shock absorber arranged in the assembly to counteract any tendency for the seat to "pitch" forwardly in response to the application of road shocks to the wheels of the vehicle.

A further object of this invention is to provide a vehicle seat assembly of the type briefly outlined above having provision for adjusting the seat fore and aft of the vehicle.

A still further object of this invention is to provide a construction wherein the seat, spring and shock absorber form an assembly capable of being adjusted fore and aft of the vehicle as a unit.

The above as well as other objects will be made more apparent as this description proceeds, especially when considered in connection with the accompanying drawings, wherein:

Figure 1 is a side elevation of a vehicle seat assembly embodying the features of the present invention;

Figure 2 is a cross-sectional view taken substantially on the plane indicated by the line 2—2 of Figure 1;

Figure 3 is a sectional view taken substantially on the plane indicated by the line 3—3 of Figure 2;

Figure 3A is a sectional view taken on the line 3A—3A of Figure 1;

Figure 4 is a sectional view taken substantially on the plane 4—4 of Figure 1;

Figure 5 is a vertical sectional view through the shock absorber employed in connection with the seat assembly;

Figure 6 is a side elevation of a slightly modified construction of seat assembly; and Figure 7 is a rear elevational view of a part of the construction shown in Figure 6.

It will be noted from the several figures of the drawings that the reference character 10 indicates a seat, 11 designates a spring for supporting the seat above a part 12 of the vehicle body, and the numeral 13 indicates a hydraulic direct acting tubular type shock absorber for controlling the action of the spring 11.

The seat 10 selected for the purpose of illustrating this invention is of the type commonly used on tractors or similar equipment and is preferably formed of sheet metal. In detail the seat 10 comprises a base portion 14 and a back portion 15 integrally connected to the base portion. If desired the seat 10 may also be provided with a back rest 16 having a back engaging pad 17 supported at the proper elevation with respect to the seat 10 by means of a tubular member 18. As shown in Figure 1, the lower end of the tubular member 18 is connected to the back 15 of the seat 10 by means of a bracket 19 shown in Figure 4 as comprising laterally spaced flanges 20 having the forward ends welded or otherwise secured to the back 10 of the seat adjacent the top of the latter. A sleeve 21 is positioned between the rear ends of the flanges 20 and is welded in place with the axis thereof extending in a generally vertical direction. The internal diameter of the sleeve 21 is predetermined to enable the lower end portion of the tube 18 to telescope into the sleeve and a pin 22 is extended transversly through the lower end of the sleeve to form an abutment for limiting downward movement of the tubular member 18 relative to the sleeve 21. Attention is also called to the fact that the lower end portion of the tubular member 18 is slotted to receive the pin 22. As a result of this construction, the pin 22 prevents rocking movement of the tubular member 18 relative to the sleeve 21, and the member 18 together with the back rest 17 may be readily removed from the seat 10 when desired.

The spring 11 comprises a bar of spring metal and is substantially U-shaped. The spring is positioned between the seat 10 and the part 12 of the vehicle in such a manner that one leg 23 of the spring engages the base portion 14 of the seat and the other leg 24 extends adjacent the part 12 of the vehicle. The rear end portion of the leg 23 is bolted or otherwise fixed to the base 14 of the seat 10 and the leg 24 slidably engages a plate 25 carried by the part 12 of the vehicle.

A substantially channelled shaped supporting bar 26 is secured to the top surface of the leg 24 of the spring for sliding movement as a unit with the spring, and a stop 27 is secured to the forward end of the bar 26 at the underside of the spring to restrict the extend of rearward sliding movement of the spring relative to the plate 25. It will be noted from Figure 1 that the rear end of the bar 26 projects beyond the corresponding end of the leg 24 of the spring 11 and a bracket 28 is fixed to the rear end of the bar 26. This bracket projects downwardly from the bar 26 and forms a stop for limiting the extent of forward movement of the spring relative to the plate 25.

It will, of course, be understood that the seat 10 slides as a unit with the spring 11 so that the operator may readily position the seat in the most advantageous location for manipulation of the vehicle controls. The seat is clamped in any one of a number of adjusted positions by means of a pressure pad 29 engageable with the base of the channel shaped supporting member 26 and operated by a cam or eccentric 30. The eccentric 30 is suitably supported in a bore formed in the pad 29 with its axis extending perpendicular to the direction of sliding movement of the bar 26 or seat 10 and is secured to a rock shaft 31. The opposite ends of the shaft 31 are respectively journalled in angle brackets 32 positioned at opposite sides of the bar 26 and having flanges 33 secured to the plate 25 by means of studs 34. Thus, it will be seen that angular movement of the rock shaft 31 in opposite directions respectively engages the pad with and releases the same from the bar 26. This rocking movement is accomplished by means of a lever 35 having one end secured to one end of the rock shaft and having the opposite end extending to a position where it may be conveniently manipulated by the occupant of the seat 10. The lever 35 is normally held in a position wherein the pad 29 grips the supporting member 26 by a tension spring 36 having one end anchored to the adjacent bracket 32 at a point spaced rearwardly of the shaft 31 and having the opposite end anchored to the lever 35 forwardly of the shaft 31. As shown in Figure 1 the rear end of the spring 36 is connected to a pin 37 having its center lying in a horizontal plane including the axis of the shaft 31. As a result of the above construction the spring serves to hold the lever 35 in either its released position or its locked position.

The shock absorber 13 is shown in Figure 1 as having the opposite ends respectively pivotally connected to the seat 10 and the supporting member 26. The upper end of the shock absorber is provided with a lug 38 which extends between the flanges 20 of the bracket 19 and is pivotally connected to the bracket by a transverse pin 39. The lower end of the shock absorber is provided with a similar lug 40 and the later is pivotally connected to the bracket 28 on the supporting member 26 by a pin 41 having its axis extending parallel to the axis of the pin 39.

It follows from the foregoing that the seat 10, spring 11 and shock absorber 13 form an assembly capable of being installed as a unit. It will further be noted that the upper end of the shock absorber is connected to the seat adjacent the top of the back 15 of the latter and that the axis of the shock absorber extends substantially vertically. As a result of the above construction maximum vertical travel of the shock absorber is provided and forward pitching of the seat is resisted.

While any one of a number of different types or direct acting shock absorbers may be employed in the seat assembly described above, nevertheless, the type shown in Figure 5 is selected for the purpose of illustration. Briefly described, the shock absorber 13 comprises a pressure cylinder 42 and an outer casing 43 cooperating with the pressure cylinder to provide a reservoir 44 for a hydraulic fluid means. The lower end of the reservoir is closed by a cap 45 having the lug 41 secured thereto and the upper end of the reservoir is closed by a suitable plug 46 which is centrally apertured to receive the piston rod 47. The upper end of the piston rod carries the lug 38 and the lower end of the rod carries a piston 49 having an external diameter predetermined to slidably engage the inner wall of the cylinder 42.

The piston 49 is provided with an outer series of ports 50 and with an inner series of ports 51. The outer ports 50 are normally closed by a check valve 52 and the inner series of ports 51 are closed by a laminated pressure relief valve 53 which is clamped to the bottom of the piston by means of a spring 54. The above construction is such as to enable relatively free flow of fluid through the piston in an upward direction end to provide restricted flow of fluid downwardly through the piston.

The lower end of the cylinder 42 is closed by a valve 55 having a central opening 56 communicating with the reservoir 44 and having a series of ports 57 surrounding the central opening 56 and also communicating with the reservoir. The flow of fluid into the cylinder 42 through the central opening 56 is controlled by a check valve 58 and the flow of fluid from the cylinder 42 to the reservoir 44 is regulated by a laminated pressure relief valve 59. As a result of this construction fluid is permitted to flow relatively freely from the reservoir 44 to the cylinder 42 and the flow of fluid in the opposite direction from the cylinder 42 to the reservoir is restricted to a substantial degree.

In operation when the piston 49 travels downwardly the fluid in the cylinder 42 below the piston passes upwardly through the series of ports 50 and the pressure of this fluid unseats the check valve 52 to permit the fluid to enter the portion of the cylinder above the piston. Due to the fact that the piston rod 47 occupies a position in the portion of the cylinder above the piston 49, it follows that the available space in this portion of the cylinder is less in volume than the space below the piston. Thus, as the piston continues to move in a downward direction in the cylinder 42 sufficient pressure is built up against the valve 59 to unseat the latter and permit the excess fluid to flow into the reservoir 44 through the ports 57.

On the other hand when the piston moves in an upward direction in the cylinder 43, fluid under pressure acts upon the relief valve 53 to open the latter and permit the flow of fluid through the inner series of ports 51 in the piston to the portion of the cylinder below the piston. As the piston 49 travels upwardly in the cylinder, the piston rod 47 moves out of the cylinder and, therefore, it is necessary to replenish the cylinder with a quantity of hydraulic fluid medium. This required additional amount of fluid is supplied by the reservoir 44 through the check valve 58 which opens relatively free so that very little or no resistance is offered to the flow of the fluid. Thus, it will be apparent that the shock absorber 13 acts to dampen shocks transmitted to the seat 10 through the spring 11.

The embodiment of the invention shown in Figures 6 and 7 differs from the one previously described in that the seat 10 is not adjustable with respect to the supporting part 12 of the vehicle. In addition, it will be noted that the spring 60 is of slightly different contour than the spring 11 and is anchored directly at the lower end to the part 12 of the vehicle. The upper end of the spring is secured to the bottom of the seat 10 and is provided with a lug 61 forming an attaching bracket for the upper end of the shock absorber 13. The lower end of the shock absorber is pivoted to a bracket 62 which is secured directly to the part 12 of the vehicle.

The spring 60 is provided with a reinforcing spring 63 and operates in practically the same manner as the spring 11 to support the seat 10 upon the vehicle. The shock absorber 13 may be the same in construction as the shock absorber previously described and operates to control the action of the spring in the same manner as described in connection with the first embodiment of this invention. Attention is called to the fact that in both embodiments of this invention, the tubular type shock absorber extends substantially vertically between the seat and supporting member for the seat. As a result, the shock absorber acts as a safety strut for supporting the back portion of the seat in the event of failure of the leaf spring.

What we claim as our invention is:

A vehicle seat assembly comprising a seat having a base portion adapted to be spaced above a vehicle supporting part, a bracket substantially U-shaped in cross section having the base attachable to the supporting part, spring means positioned between the base portion of the seat and bracket, said spring means comprising a leaf spring having vertically spaced substantially parallel arms connected together at the front of the seat by a loop portion and having the lower arm slidably engageable with the base of the bracket between the legs on said bracket, means securing the upper leg to the base of the seat, a reinforcing member secured to the lower arm between the bracket legs and having a portion thereof projecting rearwardly beyond the free end of the lower spring arm so as to be engageable with the supporting part and limit forward sliding movement of said seat assembly relative to said supporting structure, a tubular direct acting hydraulic shock absorber positioned at the rear of arms with its axis extending substantially vertically and having the opposite ends respectively connected to the seat and reinforcing member portion, and releasable clamping means carried by the upwardly projecting legs on the bracket and engageable with the reinforcing member to clamp the seat assembly in any one of the adjusted positions thereof and with the spring loop portion to limit rearward sliding movement of the seat assembly relative to said bracket.

JOHN M. NICKELSEN.
CHARLES E. READ.
ROY G. SPIESS.
ARTHUR BOOR.

REFERENCES CITED

The following references are of record in the file of this patent:

UNITED STATES PATENTS

| Number | Name | Date |
|---|---|---|
| 1,747,932 | Dufaux | Feb. 18, 1930 |
| 1,777,463 | Dearing | Oct. 7, 1930 |
| 1,964,405 | Nenne | June 26, 1934 |
| 2,162,476 | Casper | June 13, 1939 |
| 2,284,352 | Zank | May 26, 1942 |
| 2,308,446 | Fruehauf | Jan. 12, 1943 |

FOREIGN PATENTS

| Number | Country | Date |
|---|---|---|
| 556,818 | France | Apr. 20, 1923 |
| 776,948 | France | Nov. 17, 1934 |